United States Patent
Decrop et al.

(10) Patent No.: US 11,122,341 B1
(45) Date of Patent: Sep. 14, 2021

(54) CONTEXTUAL EVENT SUMMARY ANNOTATIONS FOR VIDEO STREAMS

(71) Applicant: International Business Machines Corporation, Armonk, NY (US)

(72) Inventors: Clement Decrop, Arlington, VA (US); Zachary A. Silverstein, Austin, TX (US); Timothy Yep, Arlington, VA (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/102,701

(22) Filed: Nov. 24, 2020

(51) Int. Cl.
| | |
|---|---|
| *G06F 3/00* | (2006.01) |
| *G06F 13/00* | (2006.01) |
| *H04N 5/445* | (2011.01) |
| *H04N 21/84* | (2011.01) |
| *H04N 21/44* | (2011.01) |
| *G06K 9/00* | (2006.01) |
| *H04N 21/435* | (2011.01) |
| *G06F 40/169* | (2020.01) |

(52) U.S. Cl.
CPC ........... *H04N 21/84* (2013.01); *G06F 40/169* (2020.01); *G06K 9/00718* (2013.01); *H04N 21/435* (2013.01); *H04N 21/44008* (2013.01)

(58) Field of Classification Search
CPC ................. H04N 21/84; H04N 21/435; H04N 21/44008; G06F 40/169; G06K 9/00718
See application file for complete search history.

(56) References Cited

U.S. PATENT DOCUMENTS

| | | | |
|---|---|---|---|
| 8,522,289 B2 | 8/2013 | Athsani et al. | |
| 8,935,717 B2 | 1/2015 | Jarman | |
| 9,066,046 B2 | 1/2015 | Jarman et al. | |
| 9,959,872 B2 | 5/2018 | Barreira Avegliano et al. | |
| 10,300,390 B2 | 5/2019 | De La Cruz | |
| 2012/0324518 A1* | 12/2012 | Thomas | H04N 21/4532 725/87 |
| 2018/0007431 A1* | 1/2018 | Sidhu | H04N 21/4394 |
| 2019/0306563 A1 | 10/2019 | Chen et al. | |
| 2020/0053401 A1* | 2/2020 | Obara | H04N 21/24 |

(Continued)

FOREIGN PATENT DOCUMENTS

WO   WO2013177139 A1   11/2013

OTHER PUBLICATIONS

Impey, "Study: Streaming to see sports media rights revenues hit US$85bn by 2024," SportsPro Media Limited, Oct. 1, 2019, accessed Oct. 15, 2020, 3 pages. https://www.sportspromedia.com/news/streaming-tv-rights-revenues-sports-forecast-2024.

(Continued)

*Primary Examiner* — Kyu Chae
(74) *Attorney, Agent, or Firm* — Yee & Associates, P.C.

(57) ABSTRACT

Generating event summary annotation overlays on a video stream is provided. In response to detecting an occurrence of a triggering event in the video stream, a context-appropriate summary annotation of the triggering event occurring in the video stream is generated based on analysis of content and tone of dialog in the video stream within a defined window of time surrounding the triggering event. The context-appropriate summary annotation of the triggering event is displayed in the video stream for a defined interval of time.

20 Claims, 6 Drawing Sheets

(56) References Cited

U.S. PATENT DOCUMENTS

2020/0242172 A1* 7/2020 Santiago ............... G06F 16/783
2021/0026892 A1* 1/2021 Puniyani ............... G06F 16/908

OTHER PUBLICATIONS

Berrones, "Twitch Live Annotations for YouTube," Twitch, Medium, Jun. 20, 2014, accessed Oct. 15, 2020, 2 pages. https://medium.com/©Twitch/twitch-live-annotations-for-youtube-fb00818c1ad2.

* cited by examiner

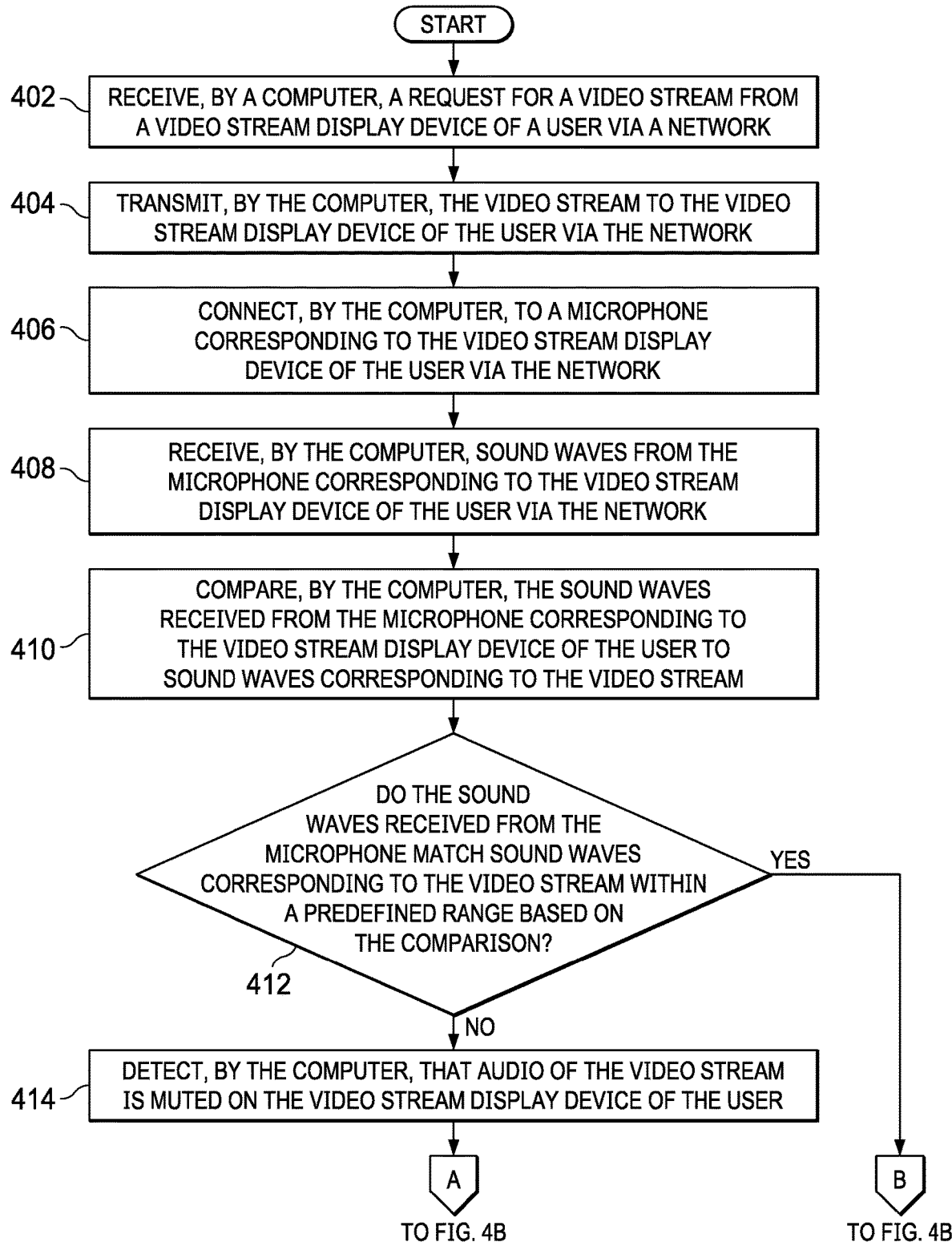

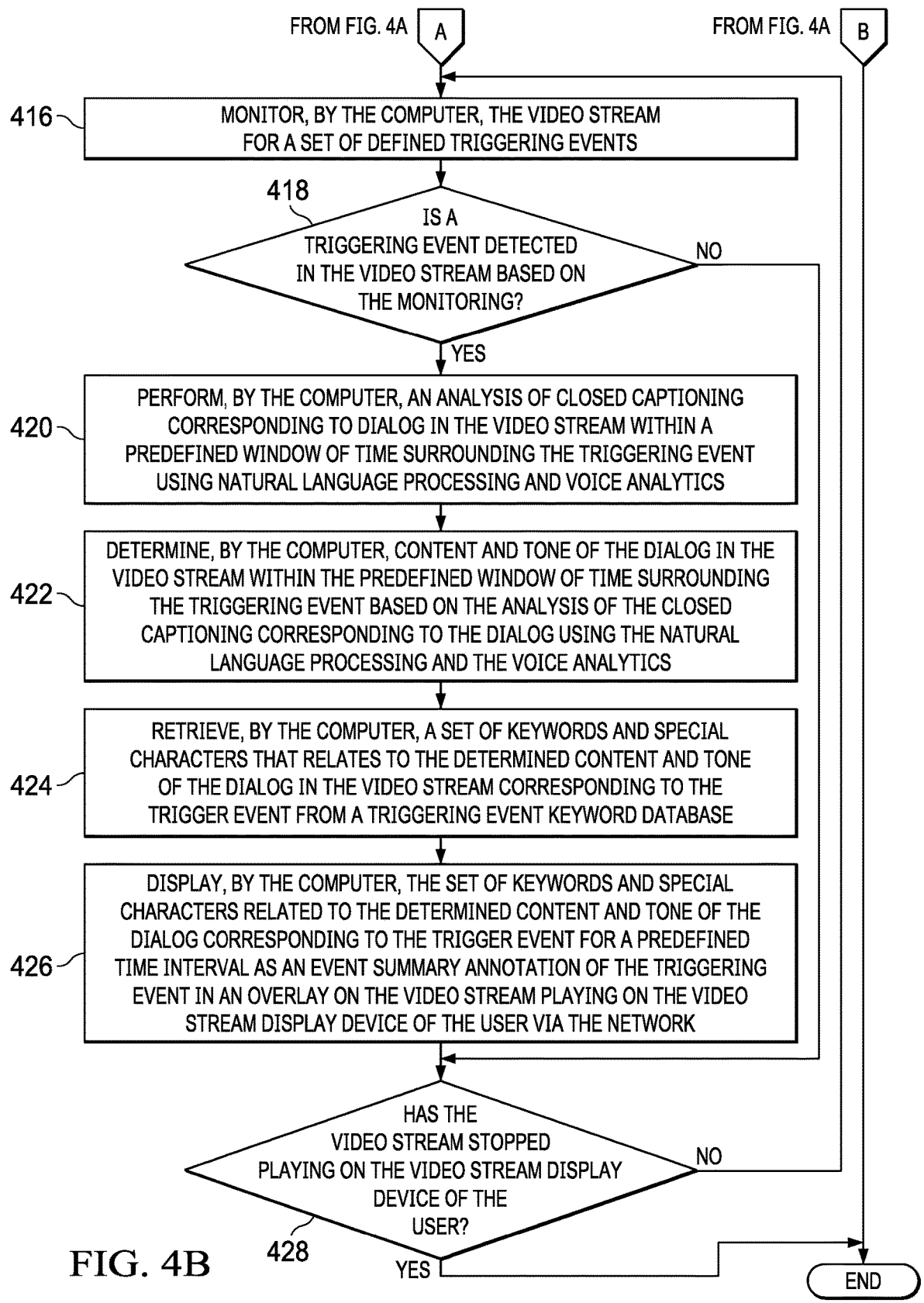

CONTEXTUAL EVENT SUMMARY ANNOTATIONS FOR VIDEO STREAMS

BACKGROUND

1. Field

The disclosure relates generally to video streaming and more specifically to providing contextual event summary annotation overlays, which correspond to triggering events occurring in a muted video stream playing on a screen of a video stream display device.

2. Description of the Related Art

Video streaming is a type of media streaming in which data corresponding to a video is continuously delivered via the Internet to a remote user via a compatible video stream display device, such as, for example, a television, smart phone, tablet computer, laptop computer, desktop computer, gaming system, or the like. Video streaming allows video to be viewed without being downloaded onto the video stream display device. Video streaming works on data streaming principles, where all video data is compressed and sent to a requesting video stream display device in small chunks. Video streaming typically requires a video stream display device to connect with a remote server, which hosts prerecorded video files or live video feeds. The server uses specific algorithms to compress the video files or feeds for transfer over a network or Internet connection. In turn, the client video stream display device decompresses and displays the video stream, allowing a user to immediately begin viewing the video stream. In other words, the video stream displays on the client video stream display device without being saved locally.

Video streaming technology has rapidly emerged in the field of information and technology. This video streaming technology helps organizations modernize their daily operations, such as, for example, scheduling meetings, conducting live conferences, interacting with customers, and the like. Another factor contributing to video streaming market growth is the rising demand for live and on-demand video content among users. Growing adoption of client video stream display devices to watch movies, television shows, live sporting events, and other events is another factor promoting the video streaming market growth. In addition, video streaming service providers offer users many options to select from to view available steaming video content.

SUMMARY

According to one illustrative embodiment, a computer-implemented method for generating event summary annotation overlays on a video stream is provided. In response to a computer detecting an occurrence of a triggering event in the video stream, the computer generates a context-appropriate summary annotation of the triggering event occurring in the video stream based on analysis of content and tone of dialog in the video stream within a defined window of time surrounding the triggering event. The computer displays the context-appropriate summary annotation of the triggering event in the video stream for a defined interval of time. According to other illustrative embodiments, a computer system and computer program product for generating event summary annotation overlays on a video stream are provided.

BRIEF DESCRIPTION OF THE DRAWINGS

FIGS. 4A-4B are a flowchart illustrating a process for generating event summary annotation overlays corresponding to triggering events on a video stream in accordance with an illustrative embodiment.

DETAILED DESCRIPTION

Figure 1:
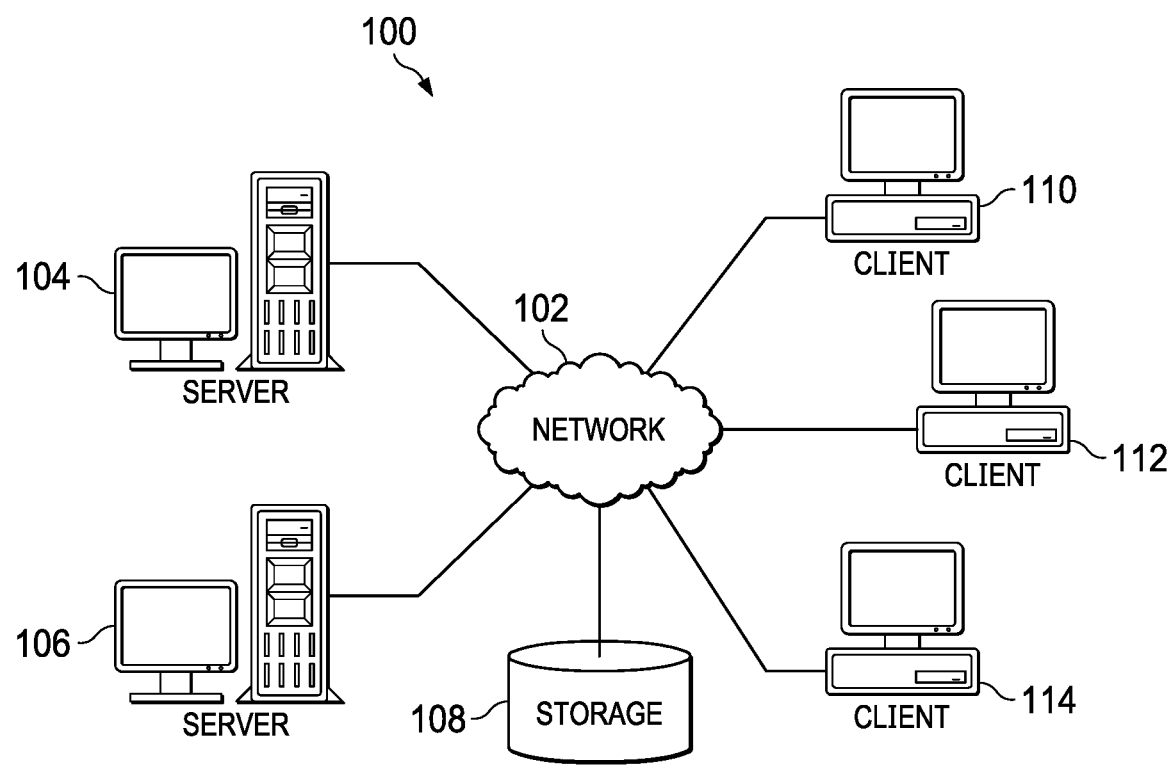
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
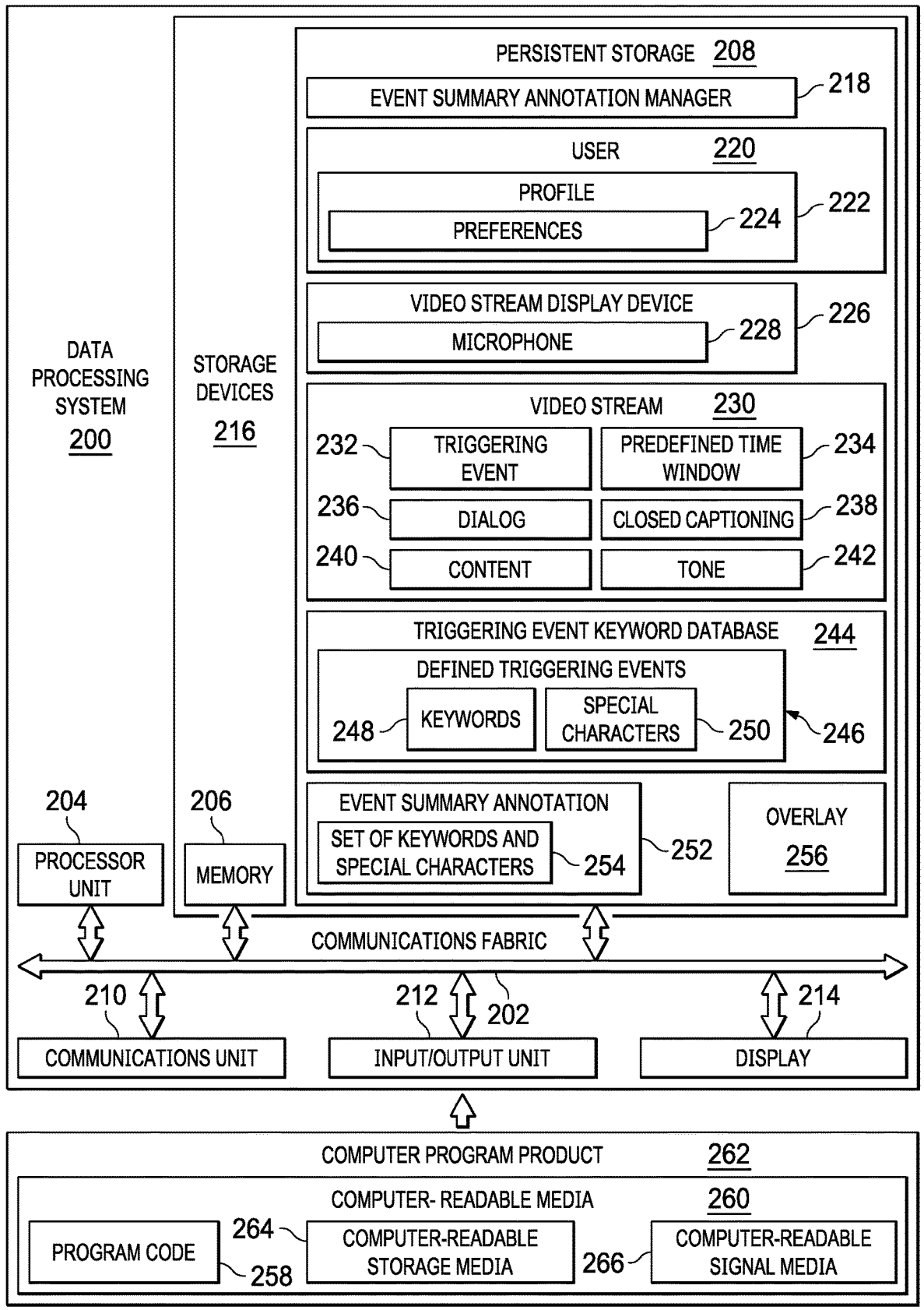
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide video stream event summary annotation overlay services to client video stream display devices. Also, it should be noted that server 104 and server 106 may each represent a cluster of servers in one or more data centers. Alternatively, server 104 and server 106 may each represent multiple computing nodes in one or more cloud environments. Further, server 104 and server 106 provide other information, such as, for example, software applications and programs, software updates, software fixes, files, data, and the like, to client video stream display devices.

Client 110, client 112, and client 114 also connect to network 102. Clients 110, 112, and 114 are client video stream display devices of server 104 and server 106. In other words, clients 110, 112, and 114 are capable of playing different types of video streams received from server 104 and server 106. The video streams may include live video streams, such as live sporting events, live entertainment, and the like, or recorded video streams, such as recorded television shows or recorded movies.

In this example, clients 110, 112, and 114 are shown as desktop or personal computers with wire communication links to network 102. However, it should be noted that clients 110, 112, and 114 are examples only and may represent other types of data processing systems, such as, for example, laptop computers, handheld computers, smart phones, smart watches, smart televisions, smart glasses, gaming systems, and the like, with wire or wireless communication links to network 102. Users of clients 110, 112, and 114 may utilize clients 110, 112, and 114 to access the video stream triggering event annotation overlay services provided by server 104 and server 106.

Storage 108 is a network storage device capable of storing any type of data in a structured format or an unstructured format. In addition, storage 108 may represent a plurality of network storage devices. Further, storage 108 may store identifiers and network addresses for a plurality of different client video stream display devices, identifiers for a plurality of different client video stream display device users, profiles corresponding to the plurality of video stream display device users, recorded video streams, video stream triggering event definitions with corresponding keywords and special characters, and the like. Furthermore, storage 108 may store other types of data, such as authentication or credential data that may include user names, passwords, and biometric data associated with video stream display device users and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer readable program code or instructions implementing the triggering event summary annotation processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer readable storage device or a computer readable storage medium is any piece of hardware that is capable of storing information, such as, for example, without limitation, data, computer readable program code in functional form, and/or other suitable information either on a transient basis or a persistent basis. Further, a computer readable storage device or a computer readable storage medium excludes a propagation medium, such as transitory signals. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores event summary annotation manager 218. However, it should be noted that even though event summary annotation manager 218 is illustrated as residing in persistent storage 208, in an alternative illustrative embodiment event summary annotation manager 218 may be a separate component of data processing system 200. For example, event summary annotation manager 218 may be a hardware component coupled to communication fabric 202 or a combination of hardware and software components. In another alternative illustrative embodiment, a first set of components of event summary annotation manager 218 may be located in data processing system 200 and a second set of components of event summary annotation manager 218 may be located in a second data processing system, such as, for example, server 106 in FIG. 1. In yet another alternative illustrative embodiment, event summary annotation manager 218 may be located in a client video stream display device, such as, for example, client 110 in FIG. 1, in addition to, or instead of, data processing system 200.

Event summary annotation manager 218 controls the process of providing event summary annotation overlays, which correspond to triggering events occurring in a muted video stream shown on a screen of a client video stream display device. It should be noted that event summary annotation manager 218 may comprise a plurality of components, such as, for example, a machine learning component, a convolutional neural network, a voice analytics component, a natural language processing component, and the like, to monitor for triggering events in video streams and to analyze the video streams.

User 220 represents a unique identifier corresponding to a particular video stream display device user. However, it should be noted that user 220 may represent a plurality of different unique identifiers for identifying different video stream display device users. Profile 222 corresponds to user 220. Profile 222 includes preferences 224. Preferences 224 may define, for example, how event summary annotation manager 218 is to display event summary annotation overlays on video streams. For example, preferences 224 may include, for example, where event summary annotation overlays are to be displayed on video streams, how long the event summary annotations overlays are to be displayed on video streams (i.e., over what time interval), color of the text corresponding to the event summary annotations, background color of event summary annotation overlays, and overlay animations for particular triggering events (e.g., bouncing overlay, flashing overlay, expanding and contracting overlay, moving with a particular object overlay, and the like). Profile 222 may include other information, such as, for example, name and/or nickname of user 220, whether user 220 is hearing-impaired, video stream favorites, team favorites, and the like.

Video stream display device 226 represents a unique identifier for a particular video stream display device, such as, for example, client 110 in FIG. 1. Video stream display device 226 corresponds to user 220. Video stream display device 226 is a client of data processing system 200 and is capable of playing live or recorded video streams. Also, it should be noted that video stream display device 226 may represent unique identifiers for a plurality of different video stream display devices corresponding to different users.

Microphone 228 corresponds to video stream display device 226. Microphone 228 may be, for example, a built-in microphone of video stream display device 226. Alternatively, microphone 228 may be a plug-in microphone connected to video stream display device 226 or a wireless microphone coupled to video stream display device 226.

Video stream 230 represents a unique identifier of a video stream currently being shown on video stream display device 226. Video stream 230 may be a live video stream, such as, for example, a live sporting event, playing on video stream display device 226 in real time. Alternatively, video stream 230 may be a recorded video stream, such as, for example, a movie, playing on video stream display device 226.

Triggering event 232 represents a particular incident, action, movement, activity, sound, or the like, which occurs in video stream 230. For example, triggering event may be a sudden increase in volume occurring in an audio feed of video stream 230 above a defined volume threshold level (e.g., sudden crowd applause and cheering for a particular play during a sporting event), a particular type of predefined sound occurring in video stream 230 (e.g., a referee's whistle being blown during the sporting event), a particular type of item suddenly appearing in video stream 230 (e.g., a referee's flag being thrown during the sporting event), particular types of predefined body movements occurring in video stream 230 (e.g., a referee suddenly putting both arms up in the air, players suddenly stopping play, or the like), or one or more particular words spoken in video stream 230 (e.g., "foul", "time out", "touchdown", "penalty kick", "goal", or the like).

Triggering event 232 prompts event summary annotation manager 218 to analyze video stream 230 for predefined time window 234 surrounding triggering event 232. Predefined time window 234 is a first amount of time prior to the occurrence of triggering event 232 and a second amount of time after the occurrence of triggering event 232 and may be, for example, 30 seconds in total length of time. In other words, event summary annotation manager 218 analyzes dialog 236 in video stream 230 for 15 seconds prior to triggering event 232 occurring in video stream 230 and 15 seconds after the occurrence of triggering event 232, or 10 seconds prior to and 20 seconds after triggering event 232, or 5 seconds prior to and 25 seconds after triggering event 232, or the like, which comprises the total amount of time for predefined time window 234. However, it should be noted that predefined time window 234 may be any defined period of time for event summary annotation manager 218 to analyze video stream 230 surrounding triggering event 232.

Event summary annotation manager 218 analyzes dialog 236 based on closed captioning 238, which corresponds to video stream 230, for predefined time window 234. Event summary annotation manager 218 may analyze closed captioning 238 corresponding to dialog 236 using, for example, natural language processing and voice analytics. Based on the analysis of closed captioning 238 corresponding to dialog 236, event summary annotation manager 218 determines content 240 and tone 242 of dialog 236 during predefined time window 234 surrounding triggering event 232. Content 240 represents the substance, subject, or gist of dialog 236 corresponding to triggering event 232 during predefined time window 234. Tone 242 represents the pitch, attitude, or sentiment of dialog 236 corresponding to triggering event 232 during predefined time window 234.

Triggering event keyword database 244 is a repository of defined triggering events 246, along with corresponding keywords 248 and special characters 250. Defined triggering events 246 represent a plurality of different triggering events, which may occur in video streams, defined by different groups of subject matter experts associated with a plurality of different areas, fields, subjects, topics, and the like. Keywords 248 represent different sets of one or more defined keywords that correspond to each respective triggering event in defined triggering events 246. Keywords 248 may include, for example, words, terms, phrases, or the like. Special characters 250 represent different sets of one or more special characters that correspond to each respective triggering event in defined triggering events 246 and/or each respective defined keyword in keywords 248. Special characters 250 may include, for example, special characters such as "@", "#", "$", "&", and "*", punctuation marks such as ".", "?", and "!", emojis, graphics, symbols, pictures, and the like.

Event summary annotation manager 218 generates event summary annotation 252 for triggering event 232 that occurred in video stream 230 based on content 240 and tone 242 of dialog 236 during predefined time window 234 surrounding triggering event 232. Event summary annotation 252 is a context-appropriate textual and graphical summarization of triggering event 232. Event summary annotation manager 218 generates event summary annotation 252 using set of keywords and special characters 254 retrieved from triggering event keyword database 244 related to content 240 and tone 242 of dialog 236 during predefined time window 234 surrounding triggering event 232.

After generating event summary annotation 252 for triggering event 232, event summary annotation manager 218 inserts event summary annotation 252 into overlay 256. After inserting event summary annotation 252 in overlay 256, event summary annotation manager 218 places or superimposes overlay 256 on video stream 230 in a specified location. The specified location may be a user-specified location or an event summary annotation manager-specified location. Overlay 256 may be, for example, a geometric shape, such as, for example, a square, rectangle, circle, triangle, star, octagon, or the like. Event summary annotation manager 218 superimposes overlay 256 on video stream 230 at the specified location for a defined time interval. The defined time interval may be, for example, 5 seconds, 10 seconds, 20 seconds, 30 seconds, 1 minute, or any other defined increment of time.

As a result, data processing system 200 operates as a special purpose computer system in which event summary annotation manager 218 in data processing system 200 enables generation of context-relevant event summary annotation overlays, which correspond to triggering events occurring in muted video streams playing on client video stream display devices. In particular, event summary annotation manager 218 transforms data processing system 200 into a special purpose computer system as compared to currently available general computer systems that do not have event summary annotation manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 258 is located in a functional form on computer readable media 260 that is selectively removable and may be loaded onto or transferred to data processing system 200 for running by processor unit 204. Program code 258 and computer readable media 260 form computer program product 262. In one example, computer readable media 260 may be computer readable storage media 264 or computer readable signal media 266.

In these illustrative examples, computer readable storage media 264 is a physical or tangible storage device used to store program code 258 rather than a medium that propagates or transmits program code 258. Computer readable storage media 264 may include, for example, an optical or magnetic disc that is inserted or placed into a drive or other device that is part of persistent storage 208 for transfer onto a storage device, such as a hard drive, that is part of persistent storage 208. Computer readable storage media 264 also may take the form of a persistent storage, such as a hard drive, a thumb drive, or a flash memory that is connected to data processing system 200.

Alternatively, program code 258 may be transferred to data processing system 200 using computer readable signal media 266. Computer readable signal media 266 may be, for example, a propagated data signal containing program code 258. For example, computer readable signal media 266 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 260" can be singular or plural. For example, program code 258 can be located in computer readable media 260 in the form of a single storage device or system. In another example, program code 258 can be located in computer readable media 260 that is distributed in multiple data processing systems. In other words, some instructions in program code 258 can be located in one data processing system while other instructions in program code 258 can be located in one or more other data processing systems. For example, a portion of program code 258 can be located in computer readable media 260 in a server computer while another portion of program code 258 can be located in computer readable media 260 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 258.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Illustrative embodiments take into account that often times when watching steaming video, such as, for example, a live sporting event, some users may be listening to music instead of the audio corresponding to the live sporting event. This may occur whether these users are sitting at home watching the live sporting event, sitting in a noisy environment, such as, for example, a noisy sports bar, while watching the live sporting event, or just streaming the live sporting event on a mobile device with audio muted. However, commentary provided by sports announcers during the live sporting event may help bridge the gap of understanding between the game and users watching the event. Therefore, when the audio of the video stream is muted, it may be difficult for a user to develop an accurate understanding of what is actually occurring in the live sporting event at a particular point in time. As a result, a need exists to increase a user's understanding throughout video streaming when audio is muted or turned off. For example, closed captioning or subtitles corresponding to a streaming live sporting event can be challenging to read especially when, for example, a sports announcer is quickly covering a large amount of information. As a result, the user has to constantly read and pay close attention to the closed captioning at all times to understand the substance or essence of the sports commentary.

Illustrative embodiments are capable of detecting when the audio output of a video stream is muted or at a level below a defined threshold, understanding when certain triggering events occur during the video stream, and displaying an event summary annotation overlaying the video stream to provide needed context and additional insights to the user regarding the triggering events. These event summary annotations are a summary level notification regarding context of what is happening in the video stream. This summary level notification allows the user (i.e., viewer) to understand the context of what is occurring in the video stream, why it is occurring, and any other relevant information for a high-level understanding when, for example, a user is just starting to view the video stream (e.g., live broadcast, video stream, or video feed in real time or a stored video file). In other words, illustrative embodiments provide highlights and relevant content to ensure that a user's attention is captured when desired, without requiring the user to fully read or pay attention to closed captioning.

As an illustrative example scenario, a user is at a favorite sports bar watching a favorite basketball team play on television. The atmosphere of the sports bar is rambunctious with the basketball game's audio muted and music playing in the background. During the basketball game, a whistle was blown and it is difficult to understand what happened without being able to hear the audio of the video stream (e.g., was a timeout taken or was a foul called and, if so, on whom). Illustrative embodiments are capable of detecting a triggering event (i.e., the whistle blowing during the basketball game) and analyzes the closed captioning corresponding to the video stream to determine what exactly happened (e.g., what was the referee's call on the court). In this example, illustrative embodiments by analyzing the closed captioning identify that the referee called a foul on #24 and then display an event summary annotation overlay on the video stream indicating "FOUL #24" on the screen of the video stream display device.

As another illustrative example scenario, a user with a hearing impairment is watching a football game. In a user settings screen, the user selects that illustrative embodiments will always be enabled because of the hearing impairment. During the football game a flag is thrown by a referee indicating a rule infraction (i.e., a triggering event). However, sports announcers in commentary of the game seem to doubt whether the flag was correctly thrown. Illustrative embodiments by analyzing the closed captioning using, for example, natural language processing, determine that the sports announcers are questioning the correctness of the flag and display, for example, "Was that a foul?" on the screen to keep the hearing-impaired user in the loop.

Users opt in to the video stream contextual annotation service provided by illustrative embodiments by agreeing to use illustrative embodiments for the purpose of understanding context and gaining insights into events occurring in video streams (e.g., live streaming sporting events). In addition, users may provide a user profile indicating, for example, user preferences regarding the event summary annotations of certain user-defined triggering events (e.g., position of the contextual annotation overlays on screen, text color preferences of the annotations, background color of annotation overlays, animation of the overlays, such as a bouncing overlay (e.g., bobbing up and down on the screen), a flashing overlay (e.g., turning on and off in rapid succession on the screen), or a moving overlay (e.g., following a particular object on the screen such as a person, animal, vehicle, or the like associated with a particular triggering event)), whether a particular user has a hearing impairment, and the like.

Further, illustrative embodiments, via a network, connect to a plurality of different sensors corresponding to a video stream (e.g., a set of imaging devices, such as cameras, covering various angles at a live sporting event, a set of sound capturing devices, such as microphones, covering various locations at the live sporting event, and the like). Furthermore, illustrative embodiments determine whether the audio of the display device is muted or whether the audio is drowned out by other media and/or background noises. Illustrative embodiments utilize a microphone corresponding to the video stream display device (e.g., built-in or plugged-in microphone) to detect whether the sound waves picked up by the microphone around the video stream display device match (e.g., within a predefined upper and lower threshold range) the sound waves of the video stream. If the detected sound waves (i.e., of the display device and any background noise) picked up by the microphone do not match the video stream audio within the predefined threshold range, then illustrative embodiments determine that the vide stream audio is muted or drowned out by other media or background noise. Illustrative embodiments also determine whether a set of speakers corresponding to the video stream display device are turned on or off. However, this may include the set of speakers being turned on, but outputting a different video stream or other type of medium such as music (i.e., the set of speakers is connected to Bluetooth technology instead of the display device). The user can manually select to mute the video stream audio.

Illustrative embodiments continuously monitor for triggering events in the video stream. It should be noted that illustrative embodiments may utilize, for example, a convolutional neural network and the like to analyze the video stream to detect triggering events. Triggering events may include, for example, predefined body movements of people in the video stream (e.g., players on a basketball court going from continuous movement to little or no movement for a defined time interval), predefined sounds in the video stream (e.g., a whistle blown during a basketball game), predefined items appearing in the video stream (e.g., a flag thrown during a football game), predefined words spoken in the video stream (e.g., the word "foul" spoken by a sports announcer during a game), and the like.

Moreover, in addition to analyzing the close captioning corresponding to the video stream, illustrative embodiments utilize a voice analytics component to detect a specific tone or pitch used by people speaking (e.g., sports announcers) in the video stream (e.g., a detected tone above a defined threshold level may indicate that a significant event has occurred, such as a game winning touchdown). Increased tone by the speakers may also indicate doubt, excitement, disappointment, sadness, joy, frustration, anger, or the like. Based on the detected tone and analyzed closed captioning text, illustrative embodiments display on a screen of the display device certain text, such as, for example, key words and special characters (e.g., "Is it a foul?") retrieved from an existing triggering event keyword database. The keywords may include any term, phrase, text, sentence, or the like that relate to a plurality of predefined triggering events. The special characters may include, for example, special characters such as @, #, $, &, and *, punctuation marks, graphics, emojis, pictures, symbols, and the like. The triggering event keyword database of key words and special characters may be initially generated by a group of subject matter experts corresponding to different fields of expertise. Afterward, illustrative embodiments may develop the triggering event keyword database over time using a machine learning component that was trained using a training dataset of key words and special characters input by the group of subject matter experts. Also, the database may include keywords from different languages corresponding to different users.

Illustrative embodiments may also utilize a haptic component of the display device to generate, for example, a vibration whenever a triggering event is detected in the video stream (e.g., when a golfer sinks a put to win a professional golf tournament). Further, illustrative embodiments may generate a personalized event summary annotation by incorporating the user's name within the annotation. Furthermore, based on context of triggering events in the video stream, illustrative embodiments may color-code the context. In other words, a user may like to understand the difference between statements (e.g., sports announcer commentary) related to different groups of people (e.g., different teams or individuals) shown in the video stream. For example, illustrative embodiments may highlight contextual comments regarding one team within an event summary annotation overlay using a first set of colors, such as blue and white, and highlight contextual comments regarding the other team using a second set of colors, such as yellow and green, based on preferences in the user profile. This will enable the user to quickly understand whether a particular event summary annotation was referring to one team or the other. As another example, illustrative embodiments for event summary annotations corresponding to a courtroom trial may indicate a name of a person on the witness stand and reason for being questioned to provide context during direct examination, cross examination, rebuttal, and the like. Also, illustrative embodiments may provide event summary annotations to provide context during opening statements, closing statements, objections, and the like made by the attorneys. Further, illustrative embodiments may contextually annotate comments made by the judge during the proceeding.

Thus, illustrative embodiments provide one or more technical solutions that overcome a technical problem with providing contextual event summary annotation overlays, which correspond to triggering events occurring in a muted video stream playing on a screen of a video stream display device. As a result, these one or more technical solutions provide a technical effect and practical application in the field of video streaming.

Figure 3:
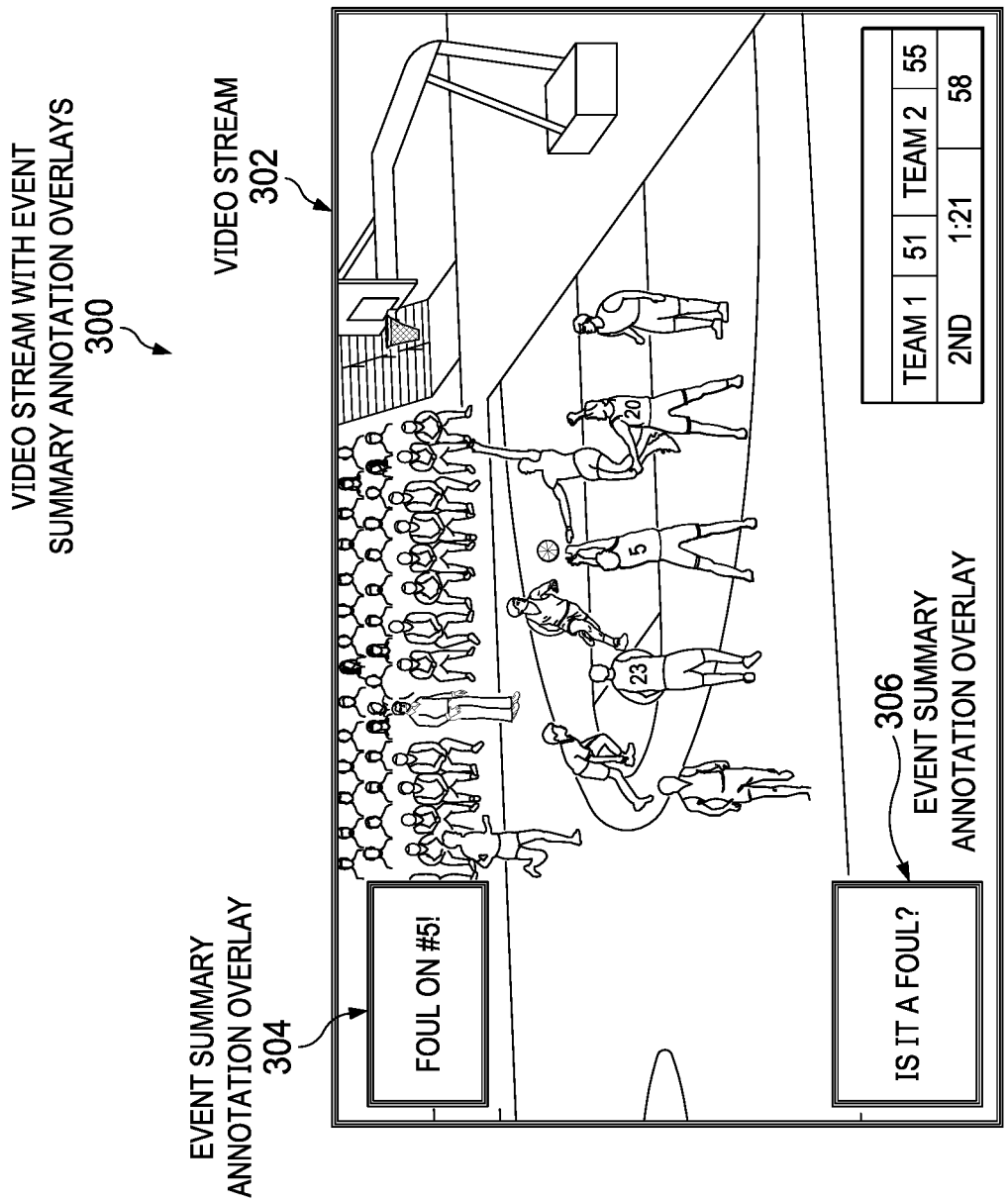
FIG. 3 is a diagram illustrating an example of a video stream with event summary annotation overlays in accordance with an illustrative embodiment.

With reference now to FIG. 3, a diagram illustrating an example of a video stream with event summary annotation overlays is depicted in accordance with an illustrative embodiment. Video stream with event summary annotation overlays 300 may be implemented in a video stream display device, such as, for example, client 110 in FIG. 1 or video stream display device 226 in FIG. 2.

In this example, video stream with event summary annotation overlays 300 includes video stream 302, event summary annotation overlay 304, and event summary annotation overlay 306. Video stream 302 in this example is a live sporting event in real time (i.e., basketball game) with audio feed of video stream 302 muted or drowned out by background noise. An event summary annotation manager, such as, for example, event summary annotation manager 218 in FIG. 2, continuously monitors video stream 302 for occurrence of one or more predefined triggering events during the basketball game. In this example, the triggering events are a referee's whistle being blown and stoppage of play. The event summary annotation manager may utilize, for example, machine learning and a convolutional neural network to detect the occurrence of the triggering events in video stream 302.

In response to detecting the triggering events, the event summary annotation manager uses, for example, natural language processing and voice analytics to analyze at least one of the closed captioning and the audio feed corresponding to video stream 302 for a predefined window of time surrounding the triggering events, such as, for example, five seconds before and five seconds after occurrence of the triggering events. After analyzing the closed captioning and/or the audio feed corresponding to video stream 302 for the predefined window of time surrounding the triggering events, the event summary annotation manager generates event summary annotation overlay 304, which in this example reads "FOUL ON #5!", and displays event summary annotation overlay 304 on video stream 302 in the upper left-hand corner for a predefined amount of time, such as, for example, 10 seconds. However, it should be noted that the event summary annotation manager can display event summary annotation overlay 304 at any location on video stream 302. For example, the event summary annotation manager may display event summary annotation overlay 304 adjacent to player #5 on video stream 302.

In addition, the event summary annotation manager also generates event summary annotation overlay 306, which in this example reads "IS IT A FOUL?", based on the analysis of the closed captioning and/or the audio feed corresponding to video stream 302 for the predefined window of time surrounding the triggering events. The content of event summary annotation overlay 306 may be based on commentary regarding the validity of the foul on player #5 by sports announcers immediately after the occurrence of the triggering events (i.e., within 5 seconds after the whistle had blown stopping play). In this example, the event summary annotation manager displays event summary annotation overlay 306 on video stream 302 in the lower left-hand corner for the predefined amount of time. However, as noted above, the event summary annotation manager may display event summary annotation overlay 306 anywhere on video stream 302.

With reference now to FIGS. 4A-4B, a flowchart illustrating a process for generating event summary annotation overlays corresponding to triggering events on a video stream is shown in accordance with an illustrative embodiment. The process shown in FIGS. 4A-4B may be implemented in a computer, such as, for example, server 104 in FIG. 1 or data processing system 200 in FIG. 2. For example, the process shown in FIGS. 4A-4B may be implemented in event summary annotation generator 218 in FIG. 2.

The process begins when the computer receives a request for a video stream from a video stream display device of a user via a network (step 402). In response to receiving the request, the computer transmits the video stream to the video stream display device of the user via the network (step 404). In addition, the computer connects to a microphone corresponding to the video stream display device of the user via the network (step 406).

The computer receives sound waves from the microphone corresponding to the video stream display device of the user via the network (step 408). The computer compares the sound waves received from the microphone corresponding to the video stream display device of the user to sound waves corresponding to the video stream (step 410). The computer makes a determination as to whether the sound waves received from the microphone match sound waves corresponding to the video stream within a predefined range based on the comparison (step 412).

If the computer determines that the sound waves received from the microphone do match the sound waves corresponding to the video stream within the predefined range based on the comparison, yes output of step 412, then the process terminates thereafter. If the computer determines that the sound waves received from the microphone do not match the sound waves corresponding to the video stream within the predefined range based on the comparison, no output of step 412, then the computer detects that audio of the video stream is muted on the video stream display device of the user (step 414). In addition, the computer continuously monitors the video stream for a set of defined triggering events (step 416).

The computer makes a determination as to whether a triggering event of the set of defined triggering events is detected in the video stream based on the monitoring (step 418). If the computer determines that a triggering event is not detected in the video stream based on the monitoring, no output of step 418, then the process proceeds to step 428. If the computer determines that a triggering event is detected in the video stream based on the monitoring, yes output of step 418, then the computer performs an analysis of closed captioning corresponding to dialog in the video stream within a predefined window of time surrounding the triggering event using natural language processing and voice analytics (step 420).

The computer determines content and tone of the dialog in the video stream within the predefined window of time surrounding the triggering event based on the analysis of the closed captioning corresponding to the dialog using the natural language processing and the voice analytics (step 422). Further, the computer retrieves a set of keywords and special characters that relates to the determined content and tone of the dialog in the video stream corresponding to the trigger event from a triggering event keyword database (step 424). The computer displays the set of keywords and special characters related to the determined content and tone of the dialog corresponding to the trigger event for a predefined time interval as an event summary annotation of the triggering event in an overlay on the video stream playing on the video stream display device of the user via the network (step 426).

The computer makes a determination as to whether the video stream stopped playing on the video stream display device of the user (step 428). If the computer determines that the video stream has not stopped playing on the video stream display device of the user, no output of step 428, then the process returns to step 416 where the computer continues to monitor the video stream for occurrence of triggering events. If the computer determines that the video stream has stopped playing on the video stream display device of the user, yes output of step 428, then the process terminates thereafter.

Figure 5:
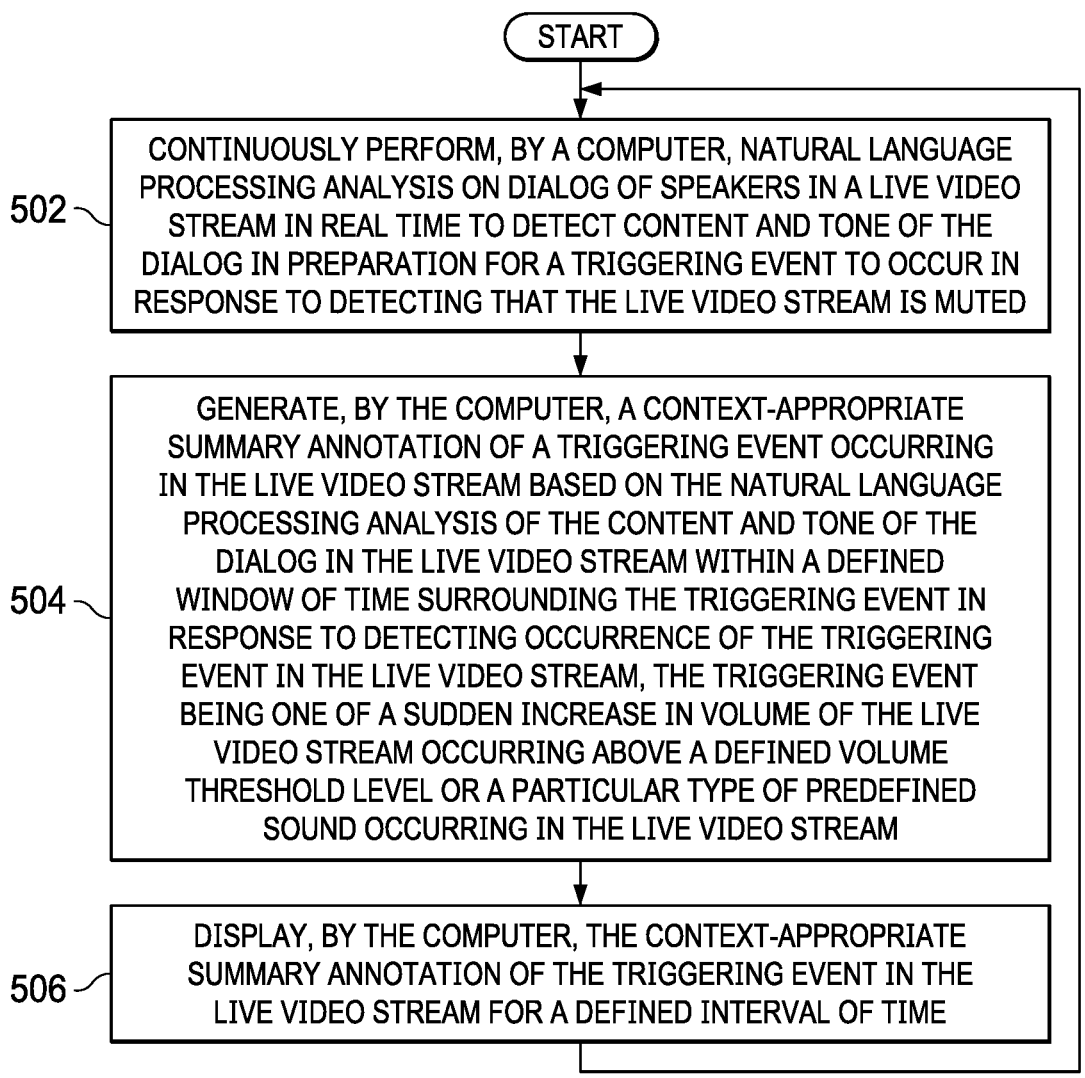
FIG. 5 is a flowchart illustrating a process for generating context-appropriate summary annotations for a live video stream in real time in accordance with an illustrative embodiment.

With reference now to FIG. 5, a flowchart illustrating a process for generating context-appropriate summary annotations for a live video stream in real time is shown in accordance with an illustrative embodiment. The process shown in FIG. 5 may be implemented in a computer, such as, for example, server 104 in FIG. 1 or data processing system 200 in FIG. 2. For example, the process shown in FIG. 5 may be implemented in event summary annotation manager 218 in FIG. 2.

The process begins when the computer continuously performs natural language processing analysis on dialog of speakers in the live video stream in real time to detect content and tone of the dialog in preparation for a triggering event to occur in response to detecting that the live video stream is muted (step 502). The computer generates a context-appropriate summary annotation of a triggering event occurring in the live video stream based on the natural language processing analysis of the content and tone of the dialog in the live video stream within a defined window of time surrounding the triggering event in response to detecting occurrence of the triggering event in the live video stream (step 504). The triggering event is one of a sudden increase in volume of the live video stream occurring above a defined volume threshold level or a particular type of predefined sound occurring in the live video stream. The computer displays the context-appropriate summary annotation of the triggering event in the live video stream for a defined interval of time (step 506). Thereafter, the process returns to step 502 where the computer continues to continuously perform the natural language processing analysis on the dialog of the speakers in the live video stream in real time.

Thus, illustrative embodiments of the present invention provide a computer-implemented method, computer system, and computer program product for providing contextual event summary annotation overlays, which correspond to triggering events occurring in a muted video stream, on a screen of a video stream display device. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating event summary annotation overlays on a video stream, the computer-implemented method comprising:
responsive to a computer detecting that the video stream is muted, performing, by the computer, natural language processing continuously on dialog in the video stream in real time to detect content and tone of the dialog in preparation for occurrence of a triggering event;
responsive to the computer detecting an occurrence of a triggering event in the video stream, generating, by the computer, a context-appropriate summary annotation of the triggering event occurring in the video stream based on analysis of the content and the tone of the dialog in the video stream within a defined window of time surrounding the triggering event; and displaying, by the computer, the context-appropriate summary annotation of the triggering event in the video stream for a defined interval of time.

2. The computer-implemented method of claim 1 further comprising:

receiving, by the computer, a request for the video stream from a video stream display device of a user via a network; and responsive to the computer receiving the request, transmitting, by the computer, the video stream to the video stream display device of the user via the network.

3. The computer-implemented method of claim 2 further comprising:

connecting, by the computer, to a microphone corresponding to the video stream display device of the user via the network;

receiving, by the computer, sound waves from the microphone corresponding to the video stream display device of the user via the network; and comparing, by the computer, the sound waves received from the microphone corresponding to the video stream display device of the user to sound waves corresponding to the video stream.

4. The computer-implemented method of claim 3 further comprising:

determining, by the computer, whether the sound waves received from the microphone match sound waves corresponding to the video stream within a predefined range based on the comparing; and responsive to the computer determining that the sound waves received from the microphone do not match the sound waves corresponding to the video stream within the predefined range based on the comparing, detecting, by the computer, that audio of the video stream is muted on the video stream display device of the user.

5. The computer-implemented method of claim 1 further comprising:

retrieving, by the computer, a set of keywords and special characters that relates to the content and the tone of the dialog in the video stream within the defined window of time surrounding the triggering event from a triggering event keyword database; and displaying, by the computer, the set of keywords and special characters related to the content and the tone of the dialog corresponding to the trigger event for the defined interval of time as the context-appropriate summary annotation of the triggering event in an overlay on the video stream playing on a video stream display device of a user via a network.

6. The computer-implemented method of claim 5, wherein a profile corresponding to the user includes preferences that define how the computer displays the context-appropriate summary annotation in the overlay on the video stream, and wherein the preferences include one or more of where the overlay is displayed on the video stream, how long the overlay is displayed on the video stream, color of text corresponding to the context-appropriate summary annotation, background color of the overlay, and overlay animations for particular triggering events.

7. The computer-implemented method of claim 5, wherein the keywords and the special characters are retrieved from closed captioning of the video stream.

8. The computer-implemented method of claim 1, wherein the triggering event is one of a sudden increase in volume of the video stream occurring above a defined volume threshold level, a particular type of predefined sound occurring in the video stream, a particular type of item suddenly appearing in the video stream, particular types of predefined body movements occurring in the video stream, and one or more particular words spoken in the video stream.

9. The computer-implemented method of claim 1, wherein the video stream is a live video stream in real time.

10. The computer-implemented method of claim 1, wherein the defined window of time surrounding the triggering event comprises a first amount of time prior to the occurrence of the triggering event and a second amount of time after the occurrence of the triggering event.

11. A computer system for generating event summary annotation overlays on a video stream, the computer system comprising:

a bus system;

a storage device connected to the bus system, wherein the storage device stores program instructions; and a processor connected to the bus system, wherein the processor executes the program instructions to:

perform natural language processing continuously on dialog in the video stream in real time to detect content and tone of dialog in preparation for occurrence of a triggering event in response to detecting that the video stream is muted;

generate a context-appropriate summary annotation of the triggering event occurring in a video stream based on analysis of the content and the tone of the dialog in the video stream within a defined window of time surrounding the triggering event in response to detecting an occurrence of the triggering event in the video stream; and display the context-appropriate summary annotation of the triggering event in the video stream for a defined interval of time.

12. The computer system of claim 11, wherein the processor further executes the program instructions to:

receive a request for the video stream from a video stream display device of a user via a network; and transmit the video stream to the video stream display device of the user via the network in response to receiving the request.

13. The computer system of claim 12, wherein the processor further executes the program instructions to:

connect to a microphone corresponding to the video stream display device of the user via the network;

receive sound waves from the microphone corresponding to the video stream display device of the user via the network; and compare the sound waves received from the microphone corresponding to the video stream display device of the user to sound waves corresponding to the video stream.

14. The computer system of claim 13, wherein the processor further executes the program instructions to:

determine whether the sound waves received from the microphone match sound waves corresponding to the video stream within a predefined range based on comparing; and detect that audio of the video stream is muted on the video stream display device of the user in response to determining that the sound waves received from the microphone do not match the sound waves corresponding to the video stream within the predefined range based on the comparing.

15. The computer system of claim 11, wherein the natural language processing is performed by analyzing keywords and special characters retrieved from closed captioning of the video stream.

16. A computer program product for generating event summary annotation overlays on a video stream, the computer program product comprising a computer readable storage medium having program instructions embodied therewith, the program instructions executable by a computer to cause the computer to perform a method of:

responsive to the computer detecting that the video stream is muted, performing, by the computer, natural language processing continuously on dialog in the video stream in real time to detect content and tone of the dialog in preparation for occurrence of a triggering event;

responsive to the computer detecting an occurrence of a triggering event in the video stream, generating, by the computer, a context-appropriate summary annotation of the triggering event occurring in the video stream based on analysis of the content and the tone of the dialog in the video stream within a defined window of time surrounding the triggering event; and displaying, by the computer, the context-appropriate summary annotation of the triggering event in the video stream for a defined interval of time.

17. The computer program product of claim 16 further comprising:

receiving, by the computer, a request for the video stream from a video stream display device of a user via a network; and responsive to the computer receiving the request, transmitting, by the computer, the video stream to the video stream display device of the user via the network.

18. The computer program product of claim 17 further comprising:

connecting, by the computer, to a microphone corresponding to the video stream display device of the user via the network;

receiving, by the computer, sound waves from the microphone corresponding to the video stream display device of the user via the network; and comparing, by the computer, the sound waves received from the microphone corresponding to the video stream display device of the user to sound waves corresponding to the video stream.

19. The computer program product of claim 18 further comprising:

determining, by the computer, whether the sound waves received from the microphone match sound waves corresponding to the video stream within a predefined range based on the comparing; and responsive to the computer determining that the sound waves received from the microphone do not match the sound waves corresponding to the video stream within the predefined range based on the comparing, detecting, by the computer, that audio of the video stream is muted on the video stream display device of the user.

20. The computer program product of claim 16, wherein the natural language processing is performed by analyzing keywords and special characters retrieved from closed captioning of the video stream.

* * * * *